United States Patent [19]  [11] 3,988,907
Bohm et al. [45] Nov. 2, 1976

[54] FLEXIBLE TORQUE-TRANSMITTING ELEMENT FOR COUPLINGS AND COUPLINGS INCLUDING SUCH ELEMENTS

[75] Inventors: Heinz-Dieter Bohm, Unna; Christian Brieseck, Dortmund; Werner Ruggen, Holzwickede, all of Germany

[73] Assignee: Maschinenfabrik Stromag G.m.b.H., Unna, Germany

[22] Filed: Mar. 21, 1975

[21] Appl. No.: 560,443

[30] Foreign Application Priority Data
Apr. 2, 1974 Germany............................ 2415911

[52] U.S. Cl...................................... 64/13; 64/11 R
[51] Int. Cl.²................................... F16D 3/78
[58] Field of Search........... 64/13, 12, 11 R, 27 NM

[56] References Cited
UNITED STATES PATENTS

| | | | |
|---|---|---|---|
| 1,392,342 | 10/1921 | Laycock | 64/13 |
| 1,565,011 | 12/1925 | Jencick | 64/13 |
| 1,691,190 | 11/1928 | Hatfield | 64/13 |
| 3,837,178 | 9/1974 | Hackforth | 64/13 |

FOREIGN PATENTS OR APPLICATIONS

| 1,425,263 | 4/1963 | Germany | 64/13 |
|---|---|---|---|

Primary Examiner—Samuel Scott
Assistant Examiner—Randall Heald
Attorney, Agent, or Firm—Erwin Salzer

[57] ABSTRACT

A flexible torque-transmitting element for tying the driven member of a flexible coupling to the driving member thereof includes a body of flexible material (such as rubber, or another elastomer) that has a rim zone. A fabric insert in said body of flexible material projects radially outwardly beyond said rim zone of said body of flexible material and forms a clamping zone situated outside said body of flexible material. Such a torque-transmitting element may be associated with annular clamping means that apply clamping pressure only against the portion of the fabric insert situated outside the body of flexible material. Preferably such a torque-transmitting element is associated with clamping means having two clamping zones, namely a first clamping zone applying a relatively large clamping pressure only against the portion of the fabric insert situated outside the body of flexible material, and a second clamping zone applying a relatively small clamping pressure directly against the body of flexible material.

15 Claims, 7 Drawing Figures

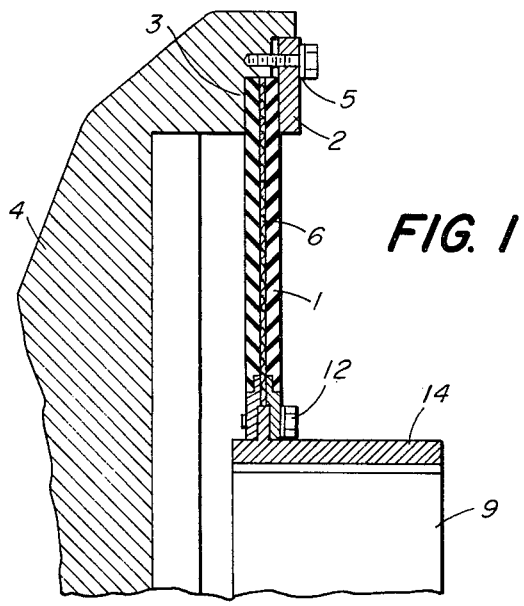
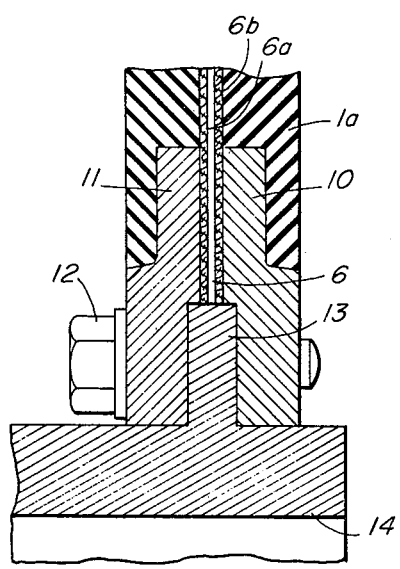
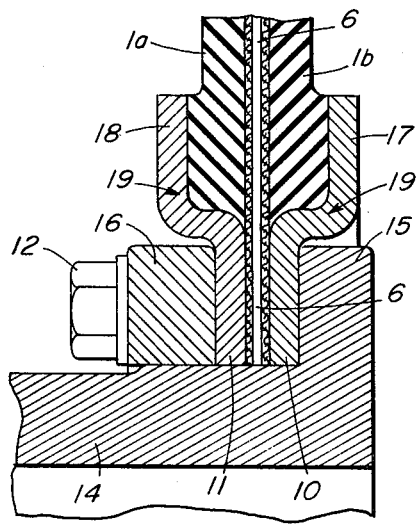

3,988,907

FLEXIBLE TORQUE-TRANSMITTING ELEMENT FOR COUPLINGS AND COUPLINGS INCLUDING SUCH ELEMENTS

BACKGROUND OF THE INVENTION

Flexible couplings include a driving member, a driven member and a flexible element transmitting torque from the driving member to the driven member. Such a flexible element is generally made up of a body of flexible material, e.g. rubber, and of a fabric insert. A flexible coupling further includes clamping means for clamping the flexible torque-transmitting element adjacent one or both of its rim zones to the driving and to the driven coupling members.

Flexible torque-transmitting elements may take various forms and shapes. In one type the flexible torque-transmitting element is generally in the shape of an automobil tire. Its rims are clamped to the driving member and to the driven member of the coupling, respectively.

In another type of flexible coupling one of a pair of coupling members has a relatively large diameter, and the other of said pair of coupling members has a relatively small diameter. Both coupling members are arranged in coaxial relation. They are tied together by a substantially angular resilient torque-transmitting element. The outer periphery of the torque-transmitting element is clamped against a surface of the large diameter coupling member, and the inner periphery of the torque-transmitting element is clamped against a surface of the small diameter coupling member. In such couplings the rims of the resilient torque-transmitting element, particularly the radially inner rim thereof, are subjected to very large clamping pressures. The degree of compression to which the resilient material is subjected of which the torque-transmitting member is made results in serious drawbacks, and may ultimately result in total inoperativeness of the torque-transmitting element and, therefore, of the entire coupling.

Resilient materials such as rubber are subject to a certain degree of ageing. As a result of such ageing, the clamping pressure and the friction at the clamed rim of the torque-transmitting element decrease progressively and the torque that can be transmitted by the tonque-transmitting element decreases as the friction decreases. To maintain the required ability of torque-transmission the clamping screws must be re-adjusted, or tightened, from time to time. This may result in excessive compression of the torque-transmitting element, and in permanent deformation thereof as well as in the formation of cracks therein.

Various suggestions made heretofore to obviate these drawbacks had no significant results. One of these rather inoperative suggestions consists in encapsulating steel-reinforcements in the rims of torque-transmitting members, or imparting a certain geometry to the rims thereof, or providing friction-increasing layers thereon. In spite of these and other means for precluding progressive deterioration of the clamping rims of torque-transmitting elements of flexible couplings, it became necessary to progressively increase the diameters of flexible couplings as the torque to be transmitted increase.

It is, therefore, the primary object of the present invention to provide torque-transmitting elements for flexible couplings and flexible couplings, respectively, that have a relatively small diameter considering the torque they are capable of transmitting, which elements and couplings are not subject to damage as a result of the application of very high clamping pressures.

SUMMARY OF THE INVENTION

A flexible torque-transmitting element embodying this invention for tying the driven member of a flexible coupling to the driving member thereof includes a body of a flexible material having a rim zone and a fabric insert in said body of flexible material. Said fabric insert has a portion projecting radially outwardly beyond said rim zone of said body of flexible material, and forming a clamping zone situated outside said body of flexible material. It is safe to apply much higher clamping pressures to said clamping zone than to said body of flexible material proper.

BRIEF DESCRIPTION OF THE DRAWINGS

FIG. 1 is a longitudinal section of a portion of a coupling embodying this invention, the other portion thereof being identical to that shown in FIG. 1 being broken away;

FIG. 2 is a longitudinal section of the clamping region of the coupling of FIG. 1 drawn on a larger scale than FIG. 1;

FIG. 3 is a longitudinal section of a modification of the clamping region shown in FIG. 2;

DESCRIPTION OF PREFERRED EMBODIMENTS

Figure 5:
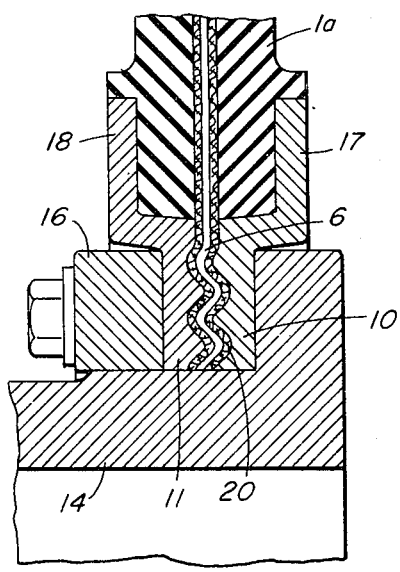
FIG. 5 is a longitudinal section of a modification of the structure shown in FIG. 3.

Referring now to FIG. 1, reference numerals 4 and 14 have been applied to indicate two parts of a coupling which are arranged in coaxial relation, each being intended to be mounted on one of a pair of coaxial shafts (not shown). One of parts 4 and 14 is mounted on the driving shaft and the other on the driven shaft. The part 4 of the coupling is of relatively large diameter and the part 14 of the coupling is of relatively small diameter. Reference numeral 1 has been applied to generally indicate an annular disk-shaped torque-transmitting element whose radially outer rim is affixed to part 4 and whose radially inner rim is affixed to part 14. Part 4 is provided with a flange 3, and the radially outer rim of torque-transmitting element 1 is clamped by means of an annular clamping ring 2 and of screws 5 (of which but one is shown in FIG. 1) against flange 3. The torque-transmitting element 1 is made up of a body of flexible material, e.g. rubber, having a fabric insert 6. The radially inner rim of torque-transmitting element 1 is affixed by means of a screw 12 and other parts to coupling member 14, which other parts are shown in detail in FIG. 2.

The fabric insert may be formed by a system of radial threads and a system of circular threads intersecting at right angles the system of radial threads. Such a fabric has been diagrammatically indicated in FIG. 4 by dash-and-dot lines.

Reference numeral 9 has been applied in FIG. 1 to indicate the common axis of parts 1, 4 and 14.

Referring now to FIG. 2, reference character 1a has been applied to indicate two layers of flexible material sandwiching therebetween two layers 6a, 6b of fabric insert. The body of flexible material formed by layers 1a sandwiches a pair of fabric layers or plies 6a, 6b. These fabric layers are actually abutting against each other, but a spacing has been shown to exist between layers 6a, 6b to be able to better distinguish between the two fabric layers. The rim of flexible body 1a adjacent coupling part 14 forms a peripheral groove, and fabric layers 6a, 6b project at the region where this peripheral groove is located radially outwardly beyond the rim zone of flexible body 1a. This outwardly projecting portion of fabric layers 6a, 6b forms a clamping zone that is engaged by a pair of clamping rings 10, 11. The clamping rings 10, 11 are affixed to the body of flexible material 1a. Assuming that the latter is rubber, the clamping rings 10, 11 may be vulcanized to the rubber layers 1a. The rings 10, 11 engage a collar 13 integral with coupling member 14 and are affixed to collar 13 by means of hex screws 12. In the present embodiment of the invention, in order to mount the torque-transmitting element 1 on collar 13, the former must be made up of two parts of which each is positioned to one side of collar 13. When pressure is applied by hex screws 12 to clamping rings 10, 11 the latter are clamped against each other, and thus a high clamping force is applied to the portion of fabric layers 6a, 6b that project beyond the dual rubber body 1a. This pressure may by far exceed the pressure that can safely be applied to the material of which the resilient body or rubber body 1a is constituted.

As an alternative the entire torque-transmitting element may be sub-divided diametrically into two complementary parts of which each is substantially semi-circular. One of these parts is inserted radially into the gap formed between flange 3 and clamping ring 2, and the other of these parts is mounted radially on collar 13. In this modification the right layer 1a and the left layer 1a of rubber or the like material may form an integral unit rather than one consisting of two parts.

While FIG. 2 shows a flexible coupling having a torque-transmitting element 1 that is made up of two separate layers 1a of resilient material, of two separable layers 6a, 6b of fabric insert, and of two separable rings 10, 11, the number of such parts may be increased, as desired, to form a stack of parts as specified above.

In all figures the same reference characters have been applied to indicate equivalent parts. Hence FIGS. 3, 5, 6 and 7 may be described in detail only to the extent that the structures shown therein differ significantly from the structure shown in FIGS. 1 and 2 described in their context.

Referring to FIG. 3, the torque-transmitting element is made up of a body of resilient material 1a, a fabric insert 6 formed by abutting plies of fabric, and clamping rings 10 and 11 engaging portions of the fabric insert 6 projecting beyond and outside of the body of flexible material 1a. The width of the body 1a of resilient material in axial direction is enlarged at 1b and the width-enlarged portion is engaged by clamping elements or clamping rings 17, 18. Clamping rings 11 and 18 are formed by a single workpiece, and clamping rings 10 and 17 are also formed by a single workpiece.

Flanges 11, 18 and 10, 19 are interconnected at 19. The spacing between the flanges of clamping rings 10, 11 is relatively narrow and the spacing between the flanges of clamping rings 17, 18 is relatively wide. Coupling element 14 is provided with a flange 15, and a clamping ring 16 is mounted on coupling element 14 and may be moved by means of hex screws 12 against flange 15. Clamping rings 10, 11 are arranged in the gap formed by parts 15, 16 and may be clamped against the outwardly projecting portion of fabric insert 6 by tightening screws 12 (of which a plurality is arranged in a circular pattern, but of which but one has been shown in FIG. 3). When clamping screws 12 are tightened, the clamping rings 17, 18 apply clamping pressure against the enlarged portion 1b of the body 1a of flexible material. The geometry of the structure of FIG. 3 is such that the axial clamping pressure exerted by clamping rings 10, 11 against the radially outwardly projecting portion of the fabric insert 6 by far exceeds the pressure applied by clamping rings 17, 18 against the body of flexible material 1a at its portion 1b of increased width. The pressure exerted by clamping rings 17, 18 upon the portion 1b of the body of flexible material 1a is transmitted by the latter to the area of the fabric insert situated between clamping rings 17, 18. As is apparent from the above, the clamping pressure exerted upon this area of the fabric insert 6 is much less than the clamping pressure exerted upon its portion that protrudes radially outwardly into the gap formed between clamping flanges 10, 11.

Figure 4:
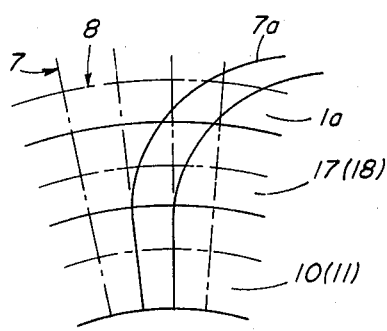
FIG. 4 is a diagrammatic representation of the displacement of the threads of the fabric insert at the clamping region of the structure shown in FIG. 3 when transmitting a torque.

FIG. 4 illustrates the effect of the clamping action of the structure of FIG. 3 and of like structures upon a fabric insert having circular threads, and radially outwardly projecting threads intersecting the former at right angles. This thread geometry is shown in FIG. 4 in dotted lines in its state prior to subjecting torque-transmitting element 1 to a torque, and is shown in solid lines in its state after the torque-transmitting element 1 has been subjected to a torque. In FIG. 4 reference numeral 7 has been applied to indicate radially extending threads and reference numeral 8 has been applied to indicate circular threads. The numbers 10 (11) to the right of FIG. 4 indicate that this portion of FIG. 4 refers to the fabric insert 6 positioned between clamping rings 10, 11. The numbers 17 (18) in FIG. 4 indicate that this part of the drawing refers to the area of the fabric insert positioned between clamping rings 17, 18. The reference character 1a in FIG. 4 indicates that this portion of the figure refers to the area of the fabric insert 6 within the region of flexible body 1a located radially inwardly from clamping rings 17, 18, and reference numeral 14 in FIG. 4 indicates that this portion of the diagram refers to the area of fabric insert 6 immediately adjacent to coupling member 14.

It will be apparent from FIG. 4 that the radial threads in the area of fabric insert 6 clamped by clamping rings 10, 11 undergoes no displacement, or distortion, when a torque is applied to torque-transmitting element 1. FIG. 4 further shows that the radially extending threads undergo a bending action, or distortion, in the region thereof situated between clamping rings 17 and 18. It is further apparent from FIG. 4 that the threads which are normally radially oriented undergo a further distortion, or bending action, in the area of fabric insert 6 situated radially inwardly beyond clamping rings 17, 18. This latter distortion has been exaggerated in FIG. 4 for reasons of greater clarity.

The intermediate clamping zone established by clamping rings 17, 18 results in a more gradual bending of the normally radially extending threads which form the faabric insert, resulting in a more significant increase of the life of the latter.

In FIG. 4 reference character 7a has been applied to indicate the geometrical configuration of the normally radially extending threads of the fabric insert 6 when the latter is under stress.

The structure of FIG. 3 involving two graded clamping zones for the fabric insert 6 is particularly desirable where the diameter of a coupling is to be minimized, large torques are to be transmitted or where the direction of torque-transmission undergoes changes as in case of reversing drives.

FIG. 5 shows a slight variation of the structure of FIG. 3. The former includes a high pressure clamping zone established by clamping rings 10, 11 and a low pressure clamping zone established by clamping rings 17, 18. The latter engage a portion of the flexible body 1a that is of increased width. The juxtaposed surfaces of clamping rings 10, 11 are non-planar. They are provided with cooperating male and female corrugations indicated at 20, resulting in an improved clamping action upon the portion of the fabric insert 6 that projects radially outwardly, and is engaged by the juxtaposed surfaces of clamping rings 10, 11. As shown in FIG. 5 the corrugations of clamping flanges 10, 11 are substantially sinusoidal. The non-planar surfaces of flanges 10 and 1 may assume other shapes, or configurations, as long as they include cooperating male and female surface elements.

Figure 6:
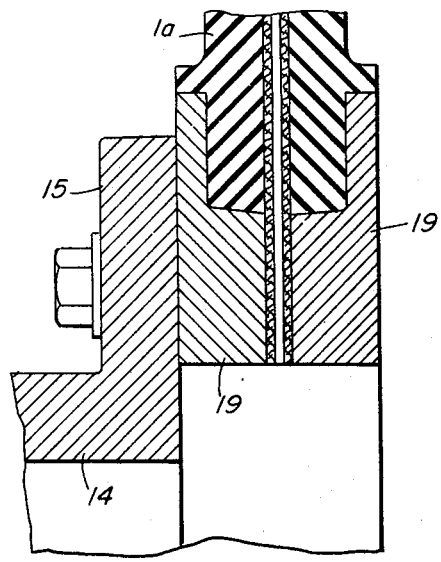
FIG. 6 is a longitudinal section of a clamping region of a torque-transmitting element for one of a pair of coupling members that is provided with a single flange for affixing the torque-transmitting element to it.

Referring now to the structure shown in FIG. 6, this structure is particularly intended for applications where but one single flange 15 is available on the radially inner coupling member 14 for securing to it a flexible torque-transmitting element. As shown in FIG. 6 the radially inner end of the flexible body, preferably made of an elastomer, is of increased width in axial direction. The fabric insert 6 projects radially outwardly. The two clamping rings 19 have radially inner clamping surfaces that engage the flexible body 1a at its axially enlarged region, and the clamping rings 19 have further radially outer clamping surfaces that engage the portion of fabric insert 6 that projects radially outwardly, and is not sandwiched by the body of flexible material 1a. The clamping member 19 may be vulcanized to the body 1a of flexible material if the latter is made of rubber, or a like vulcanizable material. The pair or dual clamping member 19 is affixed by means of a plurality of screws to the single flange 15 of coupling member 14.

The forces transmitted at the radially inner end of an elastic torque-transmitting element by far exceed the forces transmitted at the radially outer end thereof. Hence the clamping means provided by the present invention are of particular importance for clamping the radially inner end of the torque-transmitting element. This has been indicated in FIG. 1 where the radially outer periphery of the torque-transmitting element 1 is clamped in conventional fashion to the flange 3 of coupling member 4, but where the radially inner periphery of the torque-transmitting element 1 is clamped in a different way involving the present invention to the coupling member 14 of relatively small diameter. In this context attention is called to the fact that FIGS. 2, 3, 5 and 6 refer to clamping arrangements specifically designed for clamping the radially inner end of the torque-transmitting element to a coupling member. The same way of clamping could, however, be applied to the radially outer end of the torque-transmitting element where special reasons should indicate the desirability of such design.

While the preceding portion of this specification had particular reference to substantially annular torque-transmitting elements this invention is not limited to this type of elements. For instance, the annular torque-transmitting element 1 may be subdivided into a plurality of spoke-like torque-transmitting subelements which are angularly displaced relative to each other as are the spokes of a wheel.

Figure 7:
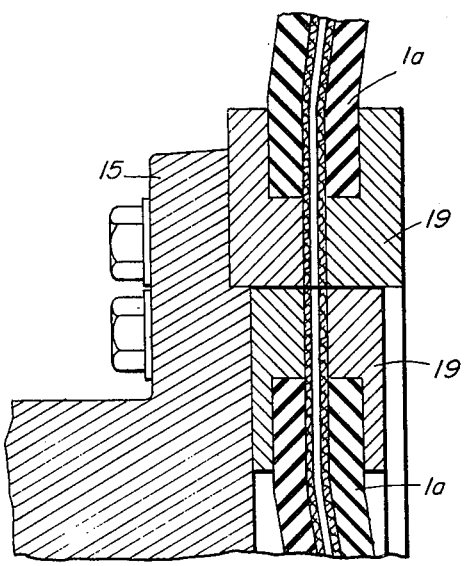
FIG. 7 is a section of a clamping structure for a flexible torque-transmitting element in the shape of a dual tire.

The dual arrangement of clamping means shown in FIG. 7 is intended for clamping torque-transmitting elements 1a substantially in the shape of a dual tire.

We claim as our invention:

1. A flexible coupling including a flexible torque-transmitting element for trying the driven member of the coupling to the driving member thereof including
    a. a body of flexible material having a rim zone;
    b. a fabric insert in said body of flexible material;
    c. said fabric insert having a portion projecting radially outwardly beyond said rim zone of said body of flexible material and forming a clamping zone situated outside said body of flexible material; and
    d. joint means for applying clamping pressure upon said body of flexible material at said rim zone thereof and upon said clamping zone of said fabric insert adapted to apply higher pressures upon said clamping zone of fabric insert than upon said body of flexible material at said rim zone thereof.

2. A flexible torque-transmitting element as specified in claim 1 wherein said portion of said fabric insert projecting radially beyond said rim zone of said body of flexible material projects beyond the radially inner rim zone thereof.

3. A flexible coupling including a flexible torque-transmitting element wherein
    a. elastomeric material has a rim zone, a median plane, and a fabric insert arranged in said median plane;
    b. a portion of said fabric insert projecting radially outwardly beyond said rim zone of said body of elastomeric material is arranged between a pair of clamping members, and wherein
    c. said pair of clamping members is supported by, and affixed to, said body of elastomeric material, 4. A flexible coupling as specified in claim 1 wherein said means for applying clamping pressure include a pair of clamping members arranged on opposite sides of said body of flexible material and wherein each of said pair of clamping members includes a first clamping surface directly engaging said clamping zone of said fabric insert and a second clamping surface arranged to apply clamping pressure against said body of flexible material.

5. A flexible torque-transmitting element as specified in claim 3 wherein each of said pair of clamping members includes a surface engaging one of the laterally outer surfaces of said body of an elastomeric material so that a portion of a clamping force exerted against said pair of clamping members acts directly against said clamping zone of said fabric insert situated outside said body of an elastomeric material, and another portion of a clamping force exerted against said pair of clamping members acts indirectly by the intermediary of said body of an elastomeric material against the portion of said fabric insert situated inside said body of an elastomeric.

6. A coupling including
   a. a pair of coaxially arranged coupling members; and
   b. flexible torque-transmitting means having one end affixed to one of said pair of coupling members and another end affixed to the other of said pair of coupling members, said torque-transmitting means including a body of an elastomeric material having a rim zone, a fabric insert inside said body of an elastomeric material and having a portion projecting beyond said rim zone and not embedded in said body of an elastomeric material, and clamping means adapted to apply a relatively high clamping pressure in the direction of the axis of said pair of coupling members against said portion of said fabric insert projecting beyond said rim zone and not embedded in said body of an elastomeric material and adapted to apply a relatively small clamping pressure directly upon said body of an elastomeric material.

7. A coupling as specified in claim 6 wherein said clamping means are formed by a pair of clamping rings arranged on opposite sides of said portion of fabric insert projecting beyond said rim zone of said body of an elastomeric material.

8. A coupling as specified in claim 7 wherein each of said pair of clamping rings has a first pair of flanges relatively narrowly spaced in axial direction applying clamping pressure only to said portion of said fabric insert projecting beyond said rim zone of said body of an elastomeric material, and wherein each of said pair of clamping rings has a second pair of flanges relatively widely spaced in axial direction applying clamping pressure to said body of an elastomeric material.

9. A coupling as specified in claim 7 wherein said body of an elastomeric material is affixed to said clamping rings.

10. A coupling as specified in claim 7 wherein the surfaces of said clamping rings juxtaposed to said portion of said fabric insert projecting beyond said rim zone of said body of an elastomeric material are non-planar.

11. A coupling as specified in claim 10 wherein said non-planar surfaces of said clamping rings are provided with co-operating male and female corrugations.

12. A coupling as specified in claim 6 wherein one of said pair of coupling members has a relatively large diameter, and the other of said pair of coupling members has a relatively small diameter, and wherein said fabric insert projects beyond said rim zone of said body of flexible material situated immediately adjacent said other of said pair of coupling members.

13. A coupling as specified in claim 6 wherein said one of said pair of coupling members has a relatively large diameter and the other of said pair of coupling members has a relatively small diameter, said other of said pair of coupling members forming a flange projectin radially ouutwardly from said other of said pair of coupling members, and wherein said coupling is further provided with means affixed to said flange for applying axial clamping pressure to both said rim zone of said body of an elastomeric material and to said portion of said fabric insert projecting beyond said rimi zone.

14. A coupling as specified in claim 6 wherein said clamping means include a pair of annular clamping members each having a first clamping zone for applying clamping pressure only against said portion of said fabric insert projecting beyond the rim zone of said body of an elastomeric material, and each having a second clamping zone abutting against said body of flexible material and applying clamping pressure to said body of an elastomeric material.

15. A flexible coupling comprising
   a. a pair of coupling members including a driving and a driven coupling member;
   b. a torque-transmitting member having a body of an elastomer affixed with the ends thereof to said driving coupling member and to said driven coupling member to transmit torques from said driving coupling member to said driven coupling member;
   c. a fabric insert embedded inside said torque-transmitting member, said fabric insert including a first substantially circularly extending system of threads and further including a second substantially radially extending system of threads, and said fabric insert including a zone projecting beyond said body of an elastomer of said torque-transmitting member to the outside of said body; and
   d. clamping means for affixing said torque-transmitting member to one of said coupling members, said clamping means having a first portion engaging directly said body of an elastomer of said torque-transmitting member and being adapted to exert relatively small pressure upon said body of an elastomer and said clamping means further having a second portion engaging said zone of said fabric insert projecting beyond said body of an elastomer and being adapted to exert a relatively high clamping pressure upon said zone.

* * * * *